United States Patent Office 3,705,077
Patented Dec. 5, 1972

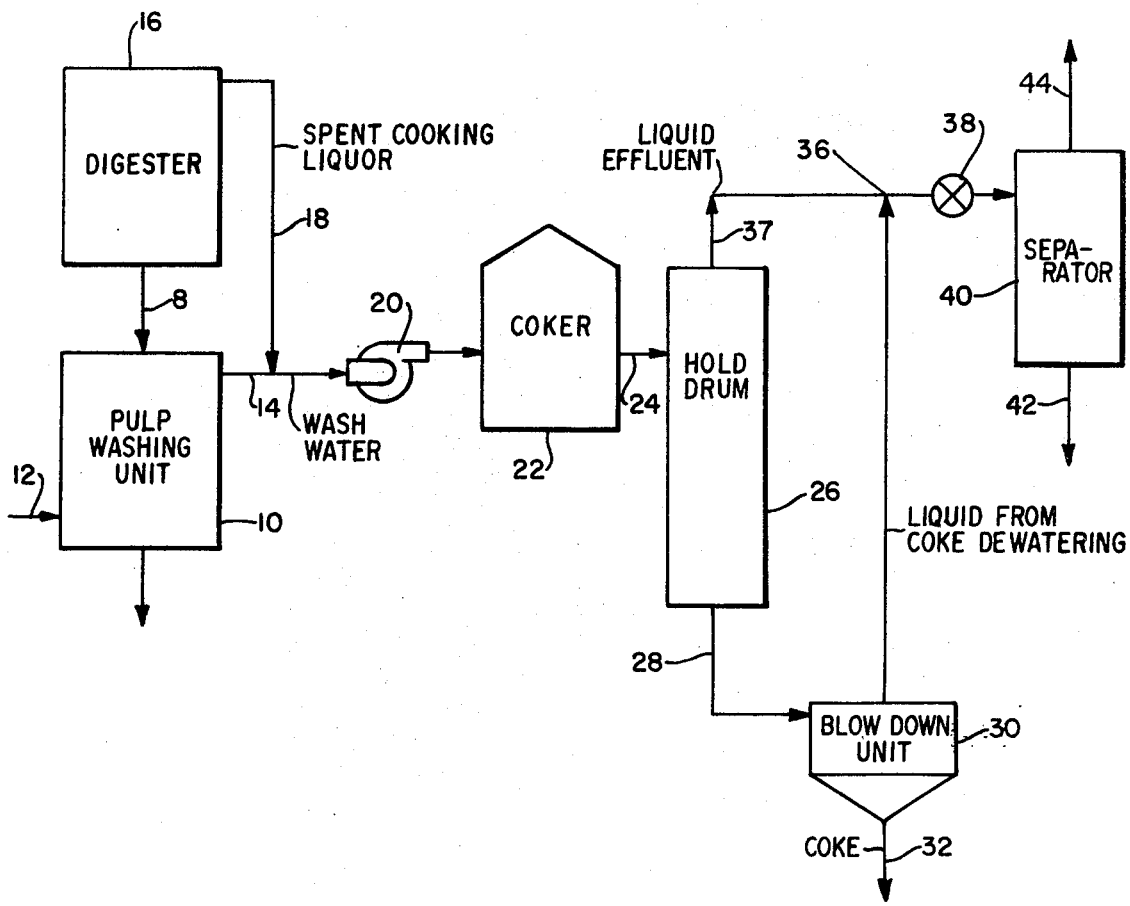

3,705,077
WASTE DISPOSAL PROCESS FOR SPENT WOOD-PULPING LIQUORS
William F. Franz, Gardiner, Howard V. Hess, Glenham, and Edward L. Cole, Fishkill, N.Y., assignors to Texaco Inc., New York, N.Y.
Filed Oct. 9, 1970, Ser. No. 79,385
Int. Cl. D21c 11/00
U.S. Cl. 162—30    6 Claims

ABSTRACT OF THE DISCLOSURE

Wash water and digester liquor from a wood pulping operation are heated at a temperature in the range of 450° F. to 700° F. under autogeneous pressures of about 1000 to about 3000 p.s.i.g. for a period of 0.5 minute to 6 hours to form coke and a purified effluent. The coke is separated from the effluent and dewatered. Liquid from this dewatering step is combined with the effluent and depressured to flash vaporize and concentrate the combined stream to a soluble chemicals concentration suitable for reconstitution and recycle to the pulping operation. Coke produced in the process may be burned as plant fuel and the ash recovered and worked for chemical values. The liquid stream is reconstituted for pulping purposes by the addition thereto of pulping chemicals derived, in part, by burning the coke produced in the process.

FIELD OF THE INVENTION

This invention relates to a waste disposal process for spent wood-pulping liquors which results in the production of a liquid effluent containing recovered chemicals suitable for reconstitution and recycle to the pulping process.

DESCRIPTION OF THE PRIOR ART

The kraft or sulfide process and the sulfite process are currently responsible for the bulk of the paper pulp production. In the kraft process wood chips are digested at an elevated temperature with an aqueous solution of sodium hydroxide, sodium sulfide, and inactive sodium carbonate. Pulp and cooking liquor are removed from the digester, the pulp is separated from the cooking liquor, and the pulp is water washed to remove the occluded waste liquor. The cooking liquor or black liquor is combined with all or a portion of the wash liquor. The recovered liquors are then evaporated in multiple-effect evaporators to a solids content of about 50 percent. The concentrated liquor may be further concentrated by direct contact with hot flue gases in a direct contact evaporator prior to being burned in a recovery furnace. In the recovery furnace all the organic matter is destroyed and the inorganic sulfur including make-up salt cake is reduced to sodium sulfide. The smelt from the recovery furnace, containing sodium carbonate and sodium sulfide is dissolved in water and reconstituted with lime. The resulting white liquor is returned to the digester for the cooking step. By these procedures chemicals are recovered but at the great cost of evaporating all or substantially all of the water used in cooking and washing.

Generally, it has not been economically feasible to recover chemicals from sulfite processing of pulp except for sulfur dioxide which is recovered as relief gas. However, recent pollution abatement procedures have encouraged the recovery of chemicals and have resulted in the use of evaporators in procedures similar to that employed in the kraft process. These procedures are expensive since large amounts of water must be evaporated.

SUMMARY OF THE INVENTION

In accordance with the present invention, it has been found that the wash water and digester liquor from the wood-pulping operation after coking at a temperature in the range of 450 to 700° F. under autogenous pressures of about 1000 to about 3000 p.s.i.g. for a period of 0.5 minute to 6 hours to form coke and a purified effluent, can have the coke and purified effluent thus produced separated; the coke dewatered and the liquid from this dewatering step can be combined with the effluent from the coking step and depressured to a range of between 500 to 0 p.s.i.g. to vaporize water and concentrate the combined stream to a solids content suitable for chemical reconstitution and recycle to the pulping process. Some of these pulping chemicals can be obtained by burning the coke produced in the coking step.

An important feature of the present invention is that the energy contained in the high temperature high pressure coker effluent serves to vaporize, and thereby remove, excess water added to the system with other pulping waste streams.

The process will be better understood by reference to the accompanying figure illustrating diagramatically a preferred embodiment of the present invention as applied to the treatment of a waste wood-pulping liquor in a system having a flash vaporization stage to concentrate the exit water streams prior to their being reconstituted with chemicals for use in the pulping operation.

Essentialy, liquid phase coking replaces the evaporator section of a pulping liquor recovery-disposal system. The chemicals to be recovered are divided between the two effluent streams resulting from the coking operation, the main stream and the liquid obtained by dewatering the coke. The coke may be burned for steam generation and chemicals obtained from this ash in known manner.

Referring to the drawing, the system of the invention is seen to be integrated with that part of a paper making plant where subsequent to separation of the pulp from the spent cooking liquor, the pulp is washed to remove residual cooking liquor. Wash water enters the pulp washing unit 10 through line 12 and emerges through line 14. The pulp reaches the pulping washing unit 10 from pulping digester 16 through line 8. Spent cooking liquor from the digesters passes through line 18 and joins with the wash liquors at the junction of lines 14 and 18. The combined liquids are pumped by pump 20 under a pressure of about 1050 p.s.i.g. to coking unit heater 22 where they are coked at, for example, a temperature of 550° F. and a pressure of 1050 p.s.i.g. The effluent thus produced then passes through line 24 into coker hold drum 26 where coking is completed and the coke settles to the bottom of the vessel. The coker hold drum retention time depends on the type of spent pulping liquor being processed, the operating conditions employed in the pulping digesters, the type of wood being processed in the pulping operation as well as the operating temperature employed in the coking process. Spent kraft pulping liquors have been found to require about two hours residence time at coking conditions while sulfite pulping liquors may be processed using residence times of three to twenty minutes, depending on the other variables listed above. Thus, a preferred range of residence times might be from three minutes to two hours.

The coke slurry passes through the bottom of the drum 26 and through line 28 into blow-down unit 30 where it is dewatered. The separated coke passes the bottom of unit 30 through line 32 for transfer to a furnace. Liquid effluent passes from the top of drum 26 through line 37 and is combined at point 36 with liquid from the coke dewatering step. The combined liquid stream is then depressurized through the throttling valve 38 to vaporize the required amount of water, which is dictated by the amount thereof present and the desired concentration of the cooking liquor which is to be made therefrom.

The pressure reduction required in any case is determined by a heat balance around the vaporization section. Sufficient pressure reduction must be taken to provide the enthalpy of vaporization of the excess water contained in the coker feed. Excess water is present because of the inclusion of pulp wash water and/or other waste streams with the spent pulping liquor in the feed to the liquid phase coking unit.

Separation of the vapor from the liquid takes place in separator 40. Liquid containing recovered chemicals for reconstitution and recycle to digesters flows out through line 42 and steam which can be used in the process passes out of the unit through line 44.

The experimental data tabulated below show results, including dissolved solids in the coker liquid effluent, obtained with the various types of spent wood pulping liquors processed.

TABLE I

[Spent kraft pulping liquor coked at 600° F., 1,375 p.s.i.g. with 2 hours hold time]

| Spent liquor charge | | | | Coker liquor effluent | | | | | Dry coke | |
|---|---|---|---|---|---|---|---|---|---|---|
| Dissolved solids, weight percent | COD, g./l. | Ash, weight percent | pH | Yield, weight percent | Dissolved solids, weight percent | COD, g./l. | Ash, weight percent | pH | Yield, weight percent | Ash, weight percent |
| 24.6 | 175 | 5.97 | 12 | 90.0 | 10.8 | 61.9 | 5.38 | 9.5 | 3.9 | 8.35 |

TABLE II

[Spent ammonia base sulfite pulping liquor coked at 550° F., 1,000 p.s.i.g. with 20 minutes hold time]

| Spent liquor charge | | | | Coker liquor effluent | | | | | Dry coke | |
|---|---|---|---|---|---|---|---|---|---|---|
| Dissolved solids, weight percent | COD, g./l. | Ash, weight percent | pH | Yield, weight percent | Dissolved solids, weight percent | COD, g./l. | Ash, weight percent | pH | Yield, weight percent | Ash, wlight percent |
| 14.0 | 189.4 | 0.15 | 1.7 | 88.2 | 2.15 | 41.9 | 0.032 | | 7.8 | 0.86 |

TABLE III

[Spent sodium base sulfite pulping liquor coked at 550° F., 1,000 p.s.i.g. with 2 hours hold time]

| Spent liquor charge | | | | Coker liquor effluent | | | | | Dry coke | |
|---|---|---|---|---|---|---|---|---|---|---|
| Dissolved solids, weight percent | COD, g./l. | Ash weight percent | pH | Yield, weight percent | Dissolved solids, weight percent | COD, g./l. | Ash, weight percent | pH | Yield, weight percent | Ash, weight percent |
| 10.1 | 93.6 | 2.75 | 4.1 | 90.7 | 3.70 | 24.6 | 1.99 | 8.7 | 3.2 | 11.43 |

An important advantage of the present process is that the major portion of the recovered chemicals is obtained in solution in the liquid coker effluent. This solution is then used to dissolve the remainder of the chemicals recovered by burning the coke.

While the invention has been illustrated with the aforedescribed physical embodiments, these are exemplary only and the scope of the invention is limited only by the subjoined claims.

We claim:

1. In a spent wood pulping liquor treatment process, the steps of:
   mixing spent digester liquor with at least one pulping waste stream, coking the mixture at a temperature in the range of 450 to 700° F. under a pressure of about 1000 to about 3000 p.s.i.g. for a period of time ranging between 0.5 minute to 6 hours to form coke and a purified effluent containing pulping chemicals dissolved therein;
   separating said coke from said effluent;
   dewatering said coke;
   combining said effluent with water obtained by said dewatering;
   depressuring the resulting stream sufficiently to provide enthalpy necessary to vaporize and concentrate said stream so as to render same suitable for reconstitution and recycle as pulping liquor in said process.

2. The process as defined in claim 1, comprising burning said coke, thereby producing ash and steam and recovering pulping chemicals from said ash.

3. The process as defined in claim 1, wherein said depressuring is effected down to the range of between 500 p.s.i.g. and 0 p.s.i.g.

4. The process as defined in claim 1, wherein said pulping waste stream is pulp wash water.

5. The process as defined in claim 2, comprising adding said recovered pulping chemicals to said stream to reconstitute pulping liquor.

6. The process as defined in claim 1, wherein the coking time ranges from 3 minutes to two hours.

References Cited

UNITED STATES PATENTS 3,591,449  7/1971  Hess et al. _____ 162—30
2,752,243  6/1956  Barton et al. _____ 162—31

NORMAN YUDKOFF, Primary Examiner

D. EDWARDS, Assistant Examiner

U.S. Cl. X.R.
162—36; 201—25